United States Patent [19]
Pflager

[11] Patent Number: 5,499,942
[45] Date of Patent: *Mar. 19, 1996

[54] HYDROSTATIC NUT AND LEAD SCREW ASSEMBLY, AND METHOD OF FORMING SAID NUT

[75] Inventor: William W. Pflager, Waynesboro, Pa.

[73] Assignee: Western Atlas Inc., Waynesboro, Pa.

[*] Notice: The term of this patent shall not extend beyond the expiration date of Pat. No. 5,405,282.

[21] Appl. No.: 365,740

[22] Filed: Dec. 29, 1994

Related U.S. Application Data

[62] Division of Ser. No. 98,059, Jul. 28, 1993, Pat. No. 5,405,282.

[51] Int. Cl.$^6$ ........................................ B24B 47/08
[52] U.S. Cl. .................... 451/14; 264/328.1; 249/59; 425/DIG. 58
[58] Field of Search .................... 451/14, 21, 19, 451/152; 470/18; 264/328.1, 331.14, 334, 318, 130, 134; 249/59; 425/DIG. 58; 411/427, 436

[56] References Cited

U.S. PATENT DOCUMENTS

| | | | |
|---|---|---|---|
| 3,081,644 | 3/1963 | Hudgens et al. | 264/264 |
| 3,313,873 | 4/1967 | Dembiak | 264/318 |
| 3,670,583 | 6/1972 | Leming | 74/89 |
| 4,790,971 | 12/1988 | Brown | 264/138 |
| 5,152,948 | 10/1992 | Lizenby | 264/242 |
| 5,405,282 | 4/1995 | Pflager | 451/14 |

*Primary Examiner*—Roberta A. Rose
*Attorney, Agent, or Firm*—Hoffman, Wasson & Gitler

[57] ABSTRACT

A method of forming a hydrostatic nut that cooperates with a lead screw for translating a wheel head, or carriage, on a grinding machine, such as a cam grinder. A lead screw, which is externally threaded, is inserted into a cylindrical mold, which is internally threaded. The lead screw is retained therein by pressure plates that seal off opposite ends of the open bore of the mold.

A continuous cavity is defined between the internal threads on the nut and the external threads on the lead screw. An epoxy resin or other castable polymer is introduced through an inlet port in the mold into the cavity. The castable polymer is allowed to cure into a rigid mass that adheres to the internal threads on the mold. The lead screw is removed, and the mold may be machined to its final configuration as a hydrostatic nut.

At least one helical channel is defined in the outer surface of the rigid mass adhered to the mold. In a preferred embodiment, one helical channel is formed on the leading edge of each thread, and a second, helical channel is formed on the trailing edge of each thread. Oppositely directed helical channels are pressurized to form a thin fluid film that prevents metal to metal contact between the complementary helical threads on the nut and the lead screw. The rigid polymeric mass is structurally reinforced by the threads defined on the metal nut, so that the channels defined on the exterior surface thereof maintain their dimensions.

6 Claims, 4 Drawing Sheets

HYDROSTATIC NUT AND LEAD SCREW ASSEMBLY, AND METHOD OF FORMING SAID NUT

This is a divisional application Ser. No. 08/098,059 filed on Jul. 28, 1993 now U.S. Pat. No. 5,405,282.

TECHNICAL FIELD

The present invention relates generally to a hydrostatic nut and lead screw assembly for a translatable carriage, such as may be used to support a grinding wheel. More particularly, the invention pertains to a method of forming the hydrostatic nut, to complement the threaded lead screw, while defining channels within the nut to receive pressurized fluid.

BACKGROUND OF THE INVENTION

In known grinding machines, an abrasive grinding wheel is rotatably mounted upon a wheel head for translation relative to a workpiece, such as a cam shaft, that is ground to a desired size and shape. The workpiece is retained in between a headstock and a footstock, and the wheel head, with the grinding wheel, is translated by a nut and lead screw arrangement. The nut is internally threaded and fits about, and coacts with, the externally threaded lead screw. The nut is secured to the wheel head, and the lead screw is driven by a motor, coupled to the end of the lead screw remote from the nut. The motor, which may be numerically controlled, rotates the lead screw relative to the nut, in either a clockwise or counter-clockwise fashion, and thus linearly translates the abrasive grinding wheel relative to the workpiece.

Previously, the abrasive grinding wheels, which might be 16 inches in diameter and formed of carborundum, would be gradually abraded away, and reduced in diameter, by extended cycles of grinding operations. Over a period of time, the wheels might be reduced by three or four inches in diameter. As the wheels gradually "shrunk", the motor, in accordance with a program, would drive the lead screw to advance the wheel head and grinding wheel toward the workpiece to compensate for such shrinkage. As the lead screw was advanced, the wear attributable to continued operation in a hostile industrial environment, on a factory or job shop floor, would be distributed over a length of lead screw comparable to the extent of shrinkage of the abrasive grinding wheel.

With the advent of more durable, harder, grinding wheels, made out of materials such as CBN (cubic-boron-nitride), the grinding wheels are reduced in diameter almost imperceptibly. CBN grinding wheels grind with great precision, require fewer dressing operations, and infrequent replacement, and thus have met with widespread acceptance. However, utilization of CBN wheels, and other grinding wheels with diamond-like hardness, has intensified the problem of wear in the lead screw and nut assembly for the wheel head and grinding wheel. While wear is inherent in using conventional grinding wheel machines, the significant reduction in grinding wheel size tended to distribute the wear over a significant length of the lead screw; conversely, the minor reduction in diameter of CBN grinding wheels, in the order of fractions of an inch, concentrates the wear on a fragment of the lead screw. Such localization of wear causes premature failure. Repeated, precise translational movement of the wheelhead relative to the workpiece is inhibited, and the exacting tolerances demanded by current engineering requirements for cam shafts, and other mechanical movements, cannot be readily maintained.

Numerous approaches have been made to address the problems of (1) localized wear, (2) excessive friction between the contacting metal surfaces of the threads of the nut and lead screw, and (3) backlash.

One approach has relied upon introducing precisely sized ball bearings between the contacting threaded surfaces and circulating the balls throughout the nut. Such approach has satisfactorily addressed the problems of excessive friction and backlash. However, such approach is prone to premature failure and does not have any damping in the direction of motion.

Another approach has relied upon hydrostatic bearings employing a thin film of fluid between the contacting threaded surfaces; such approach also requires the pressurized distribution of the thin film throughout the nut to avoid metal to metal contact between the cooperating, helically arranged teeth on the nut and lead screw. Pressurized distribution calls for precise machining operations within the metallic body of the nut to form pockets, manifolds, distribution channels, etc. and other fluid flow circuits to deliver the appropriate quantities of fluid to the desired locations.

Yet another approach has focused upon casting an epoxy material about a section of the lead screw, or a master form, that replicates such section of the lead screw. The epoxy is treated with special fillers that increase its strength, lubricity, and wear characteristics, while reducing its usual brittleness. After the casting has been allowed to cure, usually at room temperature and pressure, the casting is removed from the lead screw, and retained within a nut housing. When the lead screw is subsequently advanced relative to the nut, the internally threaded nut closely conforms to the configuration of the lead screw, with attendant reductions in frictional losses and misalignments.

The utilization of epoxy materials, such as castable polymers, is discussed in detail in U.S. Pat. No. 4,790,971, granted Dec. 13, 1988, to Ross A. Brown et al, and in U.S. Pat. No. 5,152,948, granted Oct. 6,1992, to Kevin J. Lizenby; both patents are assigned to TranTek Inc. of Traverse City, Mich.

Each of the foregoing proposed approaches has proven to be deficient in some manner, such as cost, complexity, operational characteristics, etc., and the need for a solution to all of the problems noted above, such as localized wear, excessive friction, and backlash, remains unfulfilled.

SUMMARY OF THE INVENTION

With the shortcoming of prior art approaches to the existing problems clearly in mind, a unique nut has been designed that combines the desirable characteristics of known hydrostatic bearings with the simplicity attributable to casting epoxy resins, and other castable polymers, about lead screw sections to serve as bearing materials. The resulting cast, internally threaded, nut has channels defined within the castable polymer material that permits the subsequent introduction of hydrostatic pressure into the nut. Ultimately, after the casting and curing operations have been completed, the nut rides on a thin fluid film and is suitable for use with lead screws having helical threads formed on their shanks.

A unique method of forming an internally threaded nut with channels defined in a rigid polymer material adhered to within the nut is disclosed. The method includes that step of placing wax, or positioning folded-over tape, in beads, along the outer surfaces of the lead screw, or lead screw segment, prior to introducing the epoxy resin into the mold in the space defined between the exterior threads of the lead screw and the interior threads of the nut. The wax, or folded-over tape, defines voids on the exposed surfaces of the resultant casting. When the wax, or tape, is removed, channels are formed in the rigid polymer material adhered within the nut.

The nut serves as a mold for the castable polymer material, and is then machined to size, prior to being secured within a depending ear on the wheel head of a grinding machine. The internally threaded nut, with a rigid coating of polymer material adhered to its internal threads, closely follows the externally threaded contour of the lead screw, as the lead screw is advanced, or retracted, through the nut. The channels are pressurized by fluid introduced into ports in the nut, and the fluid flows through the channels to form a thin-film fluid bearing between the cooperating surfaces on the nut and lead screw.

The molding process is conducted at room temperature and pressure. The resultant nut and lead screw assembly combines the ease of using castable polymers to form rigid coatings, with the low friction, non-binding qualities, attributable to forming a fluid film between the cooperating threads on the nut and the lead screw.

Other advances attributable to the castable nut, with its readily formed, internally situated channels, will become apparent to the skilled artisan, when the appended drawings are construed in harmony with the ensuring description. For example, the channels are reinforced and/or strengthened by the metal helical threads underlying the coating to insure long life and accurate operation. The casting technique is adaptable to diverse shapes of screw threads, multiple helical turns, and the like. Furthermore, the method of forming the hydrostatic nut allows the production of nuts, at a price competitive with commercially available ball screws, and obviates the need for complex, and difficult, machining operations.

DETAILED DESCRIPTION OF THE PREFERRED EMBODIMENT

Figure 1:
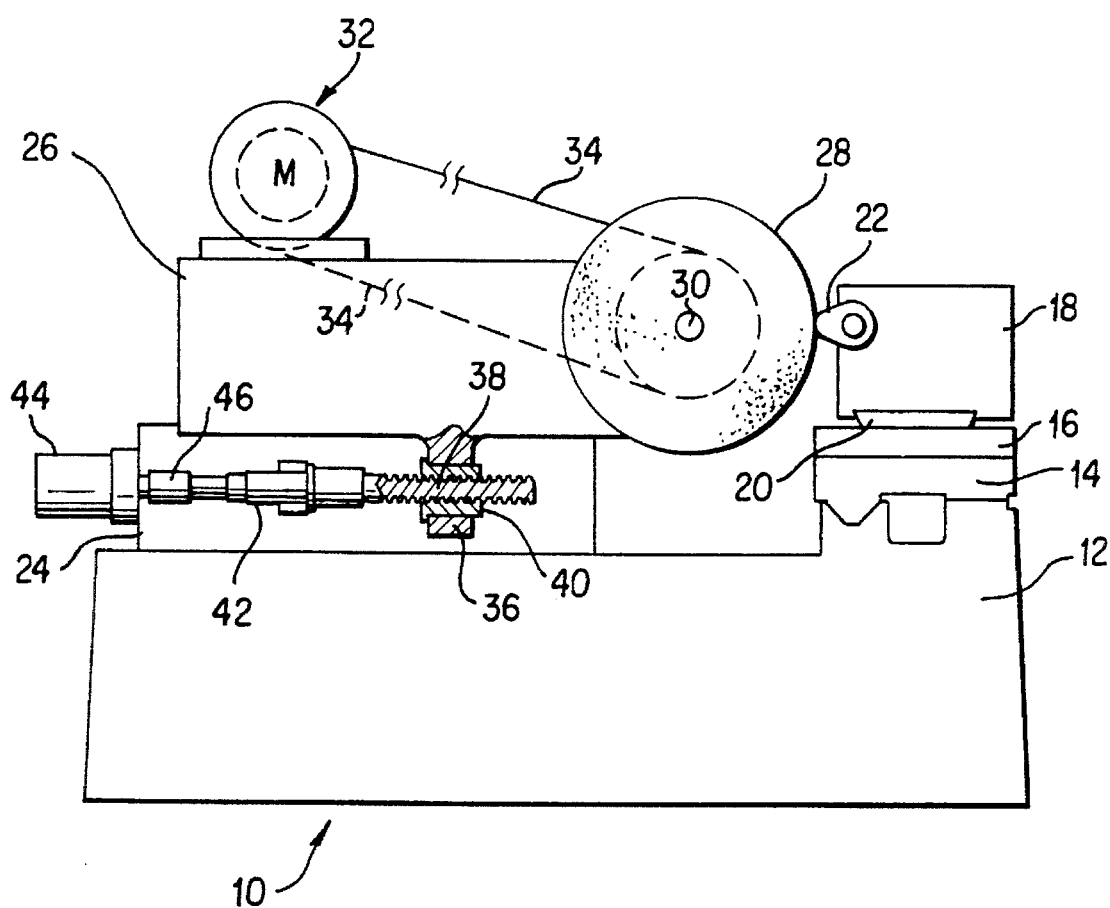
FIG. 1 is a side elevational view of a conventional grinding machine that is characterized by a unique hydrostatic nut and lead screw assembly constructed in accordance with the principles of the instant invention.

Referring now to the drawings described above, FIG. 1 depicts the key components of a grinding machine, indicated generally by reference numeral 10. A heavy metal bed 12, which may be filled with concrete, rests upon the floor (not shown) of the work place. The front end of the bed is higher than the remainder of the bed. A carriage 14 is moved transversely across the front of bed 12, and a swivel table 16 may be operatively associated with carriage 14. A headstock 18 and a footstock (not shown) are secured to swivel table 16 by a dove-tail connection 20. A workpiece 22 is secured between the headstock and footstock, and one lobe on the workpiece, which is a cam shaft, is visible.

A slide 24 moves longitudinally along the upper surface of bed 10, and a wheel head 26 moves along the upper surface of slide 24. Grinding wheel 28 is secured to axle 30, proximate the leading end of wheel head 26, and motor 32 drives wheel 28 via endless belt 34. The center line of axle 30 is aligned with the center line of work piece 22.

A post 36 depends from wheel head 26, and a passage 38 extends longitudinally therethrough. A hydrostatic nut 40 is secured within passage 38, and the nut is internally threaded. The forward end of an elongated lead screw 42 passes through the nut; the lead screw is externally threaded. A small motor 44 may be secured to the rear end of the lead screw 42 by coupling 46, and the motor drives the lead screw relative to nut 40, to translate wheel head 26 and grinding wheel 28 relative to work piece 22. Motor 44 is responsive to signals supplied, usually in digital format, from a computerized control program that correlates the positioning, and operation of, grinding wheel 28 and work piece 22.

Grinding machine 10 is conventional in most respects, and forms the environment within which unique hydrostatic nut 40 functions most satisfactorily. The method of forming hydrostatic nut 40 is also innovative, and represents a departure from known forming techniques.

Figure 2:
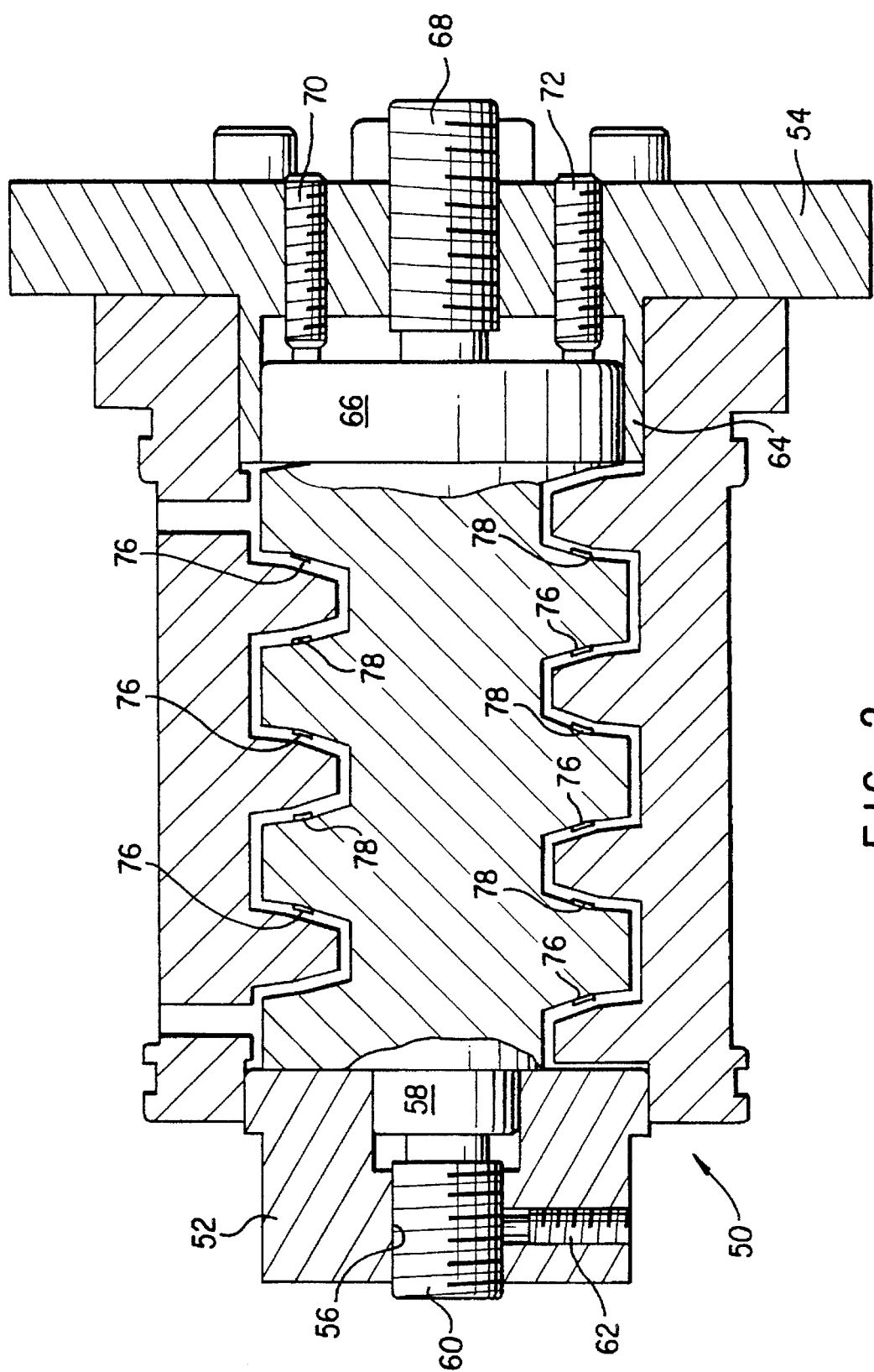
FIG. 2 is an enlarged, cross-sectional view of the mold and lead screw standard for forming the hydrostatic nut, such view being taken prior to the introduction of the molding material.
Figure 3:
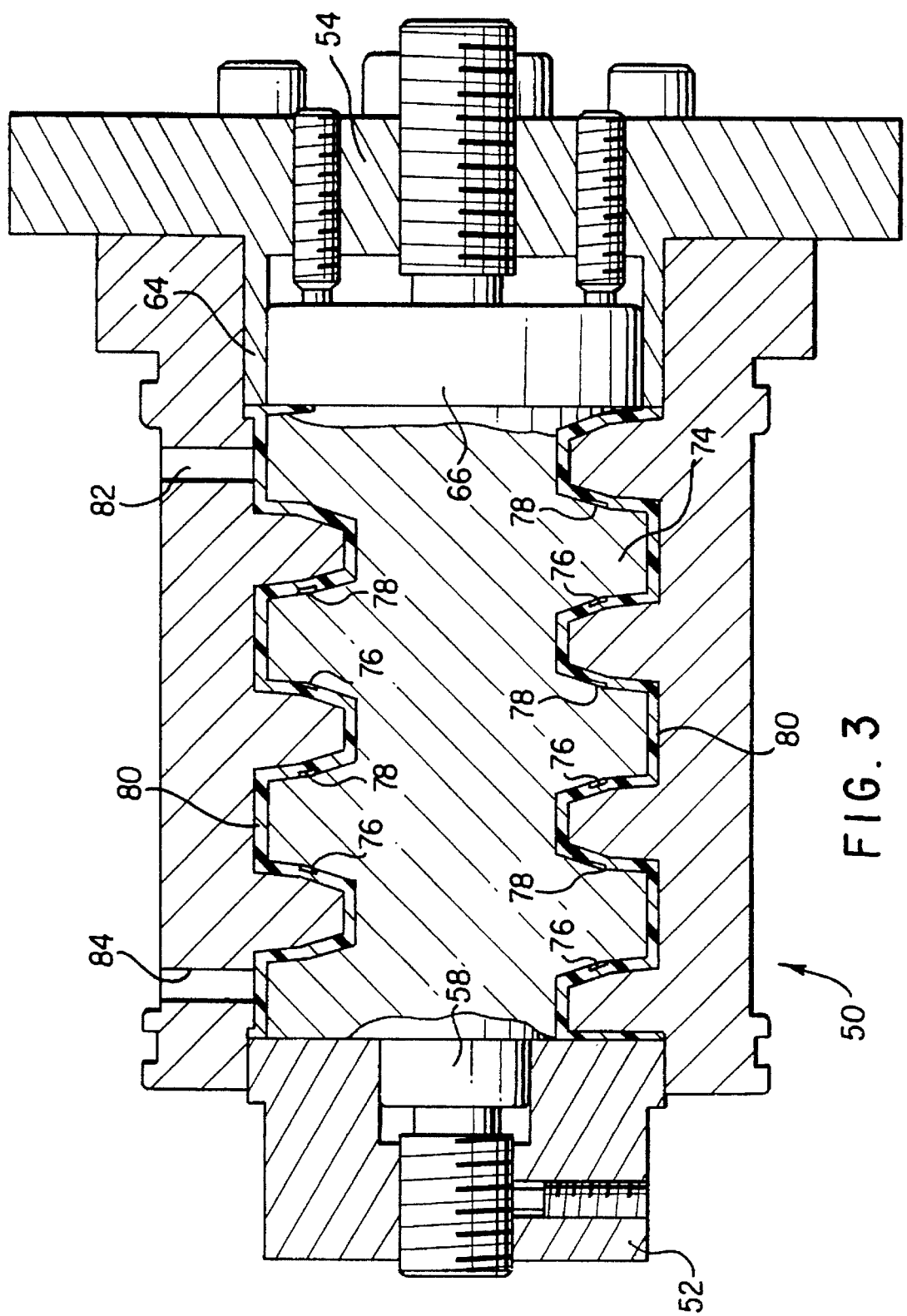
FIG. 3 is an enlarged, cross-sectional view of the mold and lead screw standard for forming the hydrostatic nut, such view being taken after the introduction of the molding material.

FIG. 2 illustrates, generally, a mold 50, which is converted into hydrostatic nut 40, by a distinctive sequence of operative steps. Mold 50 comprises a metallic, generally cylindrical body with a central bore that is open at opposite ends. A small retainer cap 52 seals one end of the mold, while a larger retainer cap 54 seals the opposite end thereof.

An internal bore 56 extends through retainer cap 52, and a pressure plate 58 can be adjusted within the bore by rotating threaded stud 60. After pressure plate 58 has been adjusted, set screw 62 is tightened to engage stud 60 and retain same in fixed position.

Larger retainer cap 54 includes an annular body with a projecting flange 64 that extends into mold 50. Pressure plate 66 moves within flange 64, and the movement of plate 66 is controlled by central stud 68, and adjusting screws 70, 72.

A lead screw standard 74 is secured within mold 50 by applying pressure to opposite ends thereof. Standard 74 conforms in size and shape to the section of the lead screw 42 that will pass through hydrostatic nut 40, and is operatively associated therewith. Standard 74 is precisely machined, with exceedingly tight tolerances, and is used repeatedly, over extended periods of time, to form hydrostatic nuts 40.

Standard 74 is externally threaded, with helical threads. The helical threads are selected to be complementary to the internal threads defined in the interior wall of mold 50, as shown in FIG. 2.

A first bead 76 of wax is applied, in a helical fashion, to the first or leading side of each thread on standard 74. Similarly, a second bead 78 of wax is applied, in a helical fashion, to the second or trailing side of each thread. Beads 76, 78 are applied to the threads of standard 74 prior to inserting same into cylindrical mold 50.

After the beads 76, 78 of wax have been applied, standard 74 is inserted into mold 50, and plates 58, 66 are adjusted inwardly to lock standard 74 is fixed position within mold 50. A release coating may be applied to the surfaces of standard 74 that are not covered by the beads of wax, prior to inserting standard 74 into mold 50.

An epoxy resin, or other castable polymer material 80, is introduced through inlet port 82 of mold 50 and into the space defined between the external teeth on standard 74 and the complementary internal teeth in mold 50. Spacing of a minute fraction of an inch exists between the complementary teeth at all points for metal to metal contact must be avoided. Air is withdrawn, from the mold through outlet port 84, so that air bubbles are avoided. Also, excess material may exit through port 84.

The polymer material flows into the continuous cavity, or spacing, exactingly defined between the external threads on standard 74 and the internal threads on mold 50. Beads 76, 78 of wax adhere tightly to the external threads on standard 74, and are impervious to attack by polymer material 80 and the release coating (not shown) on standard 74.

After the polymer material has filled the continuous cavity, mold 50 is allowed to sit for 12–18 hours, at room temperature and ambient pressure. Castable polymer material 80 cures, and assumes a rigid form. Retainer caps 52, 54 are then disengaged from opposite ends of mold 50, and lead screw standard 74 is unthreaded from mold 50. The release coating previously applied to standard 74 prevents adhesion of castable polymer material 80 to standard 74.

Several castable polymer materials might, ultimately, prove to be capable of meeting the requirements for successful operation of mold 50, and/or the ultimate operational characteristics of hydrostatic nut 40. However, one epoxy material that has proven to be most satisfactory is sold under the trademark "Moglice", and is available from the Devit Corporation.

Figure 4:
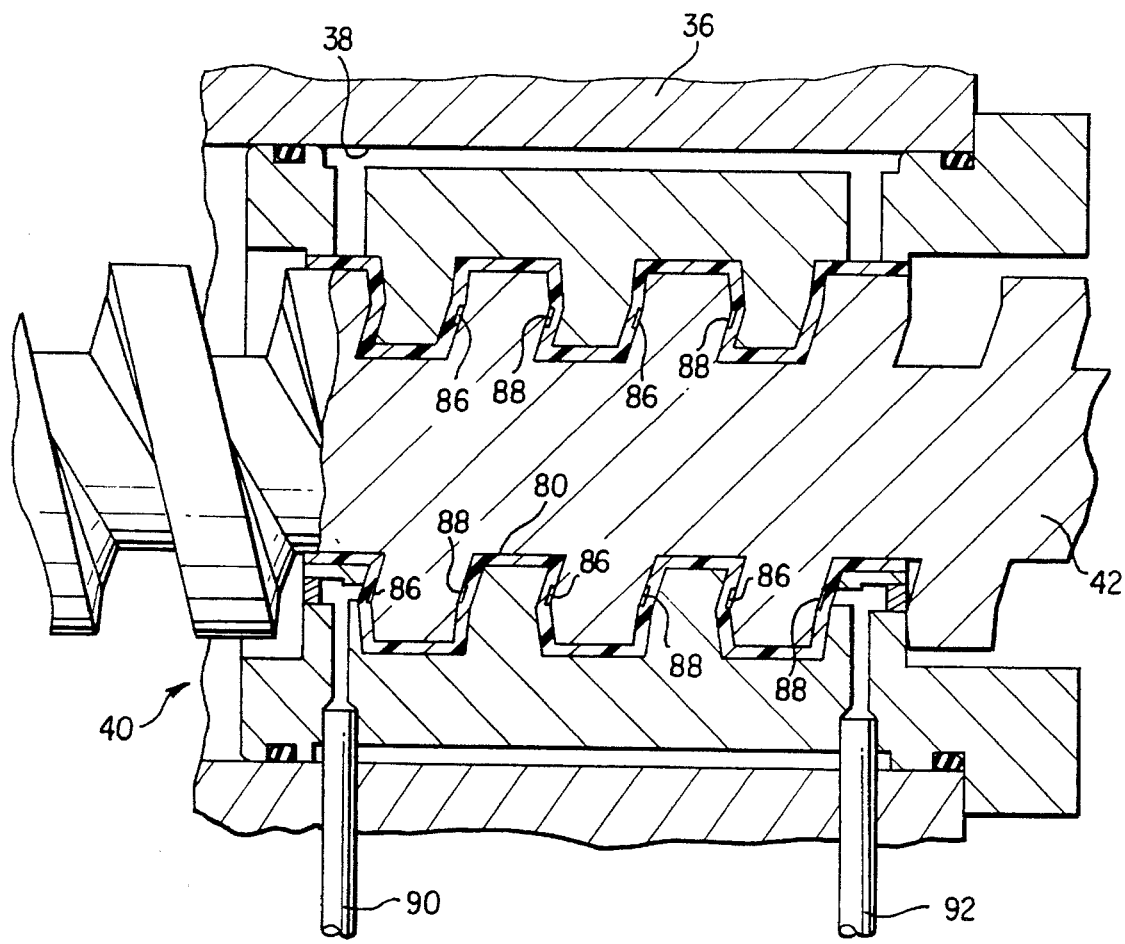
FIG. 4 is an enlarged, cross-sectional view of the unique hydrostatic nut secured to the grinding machine in operative relationship to the lead screw.

After the lead screw standard 74 has been removed, mold 50, with a rigid coating of polymer material 80 adhered to its internal threads, is machined to its desired size and shape. In such final configuration, as shown in FIG. 4, mold 50 is transformed into hydrostatic nut 40. The beads 76, 78 of wax are manually removed from cured, rigid material 80, thus forming channels 86, 88, on the exposed surfaces of the material 80 which face the external threads of lead screw 42. The wax may be dissolved, and washed away, by suitable solvents.

The hydrostatic nut is then positioned within passage 38 in post 36 that depends below wheel head 26, as shown in FIG. 4. The forward end of elongated lead screw 42 passes through, and cooperates with, nut 40 to translate wheel head 26 and grinding wheel 28 relative to work piece 22. FIG. 4 illustrates nut 40 in operative relationship to a fragment of lead screw 42.

As previously noted, the removal of the beads 76, 78 of wax defines oppositely wound helical channels 86, 88 on the exposed surfaces of cured polymer material 80. The metal threads of the nut provide structural support to the channels. First inlet conduit 90 delivers fluid to helical channel 86 so that nut 40 floats, on a thin film of air, relative to lead screw 42 as the lead screw is advanced relative to the nut. Second inlet conduit 32 delivers fluid to helical channel 88 so that nut 40 floats, on a thin film of fluid, as the lead screw is retracted relative to the nut. The films of fluid, in concert with the formed polymer material 80, insure that nut 40 operates in a substantially friction free manner.

While a preferred embodiment of the instant invention has been provided, other modifications, revisions and refinements will undoubtedly occur to the skilled artisan. For example, the wax used to form beads 76, 78 may be beeswax. The tape used for the same purpose may be a heavy duty tape, such as electrician's tape, or duct tape, which is formed into a semi-circular shape and adhered to the helical threads on lead screw standard 74 to define beads 76, 78.

In some instances, the removal of lead screw standard 74 from mold 50 shears the beads 76, 78 of wax in the cured polymer material 80, and only limited amounts of residue must be washed away with solvents, or manually be removed from material 80. Furthermore, while hydrostatic nut 40 has found applicability within cam grinding machines, the same nut may find applications in nut and lead screw assemblies for work carriages of other precision machine tools. Consequently, the appended claims should be construed broadly, in a liberal fashion commensurate with the meaningful advance in the useful arts and sciences, achieved by the hydrostatic nut, and the hydrostatic nut and lead screw assembly employing same.

I claim:

1. A method of forming a hydrostatic nut for use with a lead screw for a machine tool, such method comprising the steps of:

a) inserting a lead screw with at least one helical thread extending therealong into a mold, b) said mold having at least one helical thread on its inner surface that is complementary to, and spaced from, the helical thread on the exterior of said lead screw, c) introducing a castable polymer material into said mold to fill the space between the internal thread on said mold and the external thread on said lead screw, d) curing said polymer material into a rigid mass, e) forming a helical channel on the outer surfaces of said rigid mass of polymer material in said mold, and f) introducing pressurized fluid into said helical channel so that said mold floats on a thin film of fluid to function as a hydrostatic nut relative to said lead screw.

2. The method of forming a hydrostatic nut as defined in claim 1, further comprising the step of treating said lead screw with a release coating prior to inserting same into said mold.

3. The method of forming a hydrostatic nut as defined in claim 1, wherein said mold comprises a generally cylindrical body with retainer caps at opposite ends thereof, said method further comprising the step of adjusting said retainer caps to hold said lead screw in fixed position within said mold.

4. The method of forming a hydrostatic nut as defined in claim 1, wherein said polymer material is cured at room temperature and under ambient conditions.

5. A method of forming a hydrostatic nut adapted to be used with a lead screw, such method comprising the steps of:

a) forming a cylindrical mold with at least one helical thread defined on its inner surface, b) inserting a lead screw having a shank with at least one helical thread extending along the exterior surface of said shank into said mold, c) introducing castable polymer material into said mold to file the space between said helical thread on the inner surface of the mold and said helical thread on the exterior surface of the shank of the lead screw, d) curing said polymer material into a rigid mass at room temperature and under ambient pressure, e) removing said lead screw from said mold to expose the rigid mass of said polymer material adhered to said mold, f) defining at least one helical channel in the exterior surface of said rigid mass, g) said channel being adapted to receive pressurized fluid therein whereby said mold can function as a hydrostatic nut when operatively associated with the threads on the shank of a lead screw.

6. The method of forming a hydrostatic nut as defined in claim 5 wherein the helical threads on the inner surface of the mold are complementary to the helical threads formed on the exterior surface of the shank of the lead screw.

* * * * *